(12) United States Patent
Yan et al.

(10) Patent No.: US 10,445,268 B2
(45) Date of Patent: Oct. 15, 2019

(54) METHOD AND SYSTEM FOR BIDIRECTIONAL COMMUNICATION

(71) Applicant: NXP B.V., Eindhoven (NL)

(72) Inventors: Jinxi Yan, Pudong (CN); Shuiwen Huang, Shanghai (CN); Tinghua Yun, Shanghai (CN)

(73) Assignee: NXP B.V., Eindhoven (NL)

( * ) Notice: Subject to any disclaimer, the term of this patent is extended or adjusted under 35 U.S.C. 154(b) by 535 days.

(21) Appl. No.: 15/142,228

(22) Filed: Apr. 29, 2016

(65) Prior Publication Data
US 2016/0335210 A1    Nov. 17, 2016

(30) Foreign Application Priority Data
May 13, 2015    (CN) .......................... 2015 1 0242709

(51) Int. Cl.
*G06F 13/362* (2006.01)
*G06F 13/42* (2006.01)
*G06F 13/16* (2006.01)

(52) U.S. Cl.
CPC ........ *G06F 13/362* (2013.01); *G06F 13/1673* (2013.01); *G06F 13/4221* (2013.01)

(58) Field of Classification Search
CPC .... H03K 19/0175; G11C 16/08; G11C 16/10; G11C 16/26; G11C 16/24
USPC .................................................. 710/116
See application file for complete search history.

(56) References Cited

U.S. PATENT DOCUMENTS

| | | | | |
|---|---|---|---|---|
| 4,598,410 A | * | 7/1986 | Smith | H04L 5/1461 375/211 |
| 5,255,239 A | * | 10/1993 | Taborn | G06F 5/065 365/201 |
| 5,428,800 A | * | 6/1995 | Hsieh | G06F 13/4004 326/82 |
| 5,623,611 A | * | 4/1997 | Matsukawa | G06F 13/4072 307/112 |
| 5,736,870 A | * | 4/1998 | Greason | H03K 19/01759 326/86 |
| 5,767,718 A | * | 6/1998 | Shih | H03K 3/0372 327/203 |
| 6,060,906 A | * | 5/2000 | Chow | H03K 19/00315 326/121 |

(Continued)

FOREIGN PATENT DOCUMENTS

| | | |
|---|---|---|
| CN | 1694425 A | 11/2005 |
| CN | 103647544 A | 3/2014 |
| CN | 104052456 A | 9/2014 |

OTHER PUBLICATIONS

NXP; Product Data Sheet—NVT4555—SIM card interface level translator and supply voltage LDO Revision 2; 18 pages (May 24, 2013).

*Primary Examiner* — Titus Wong

(57) ABSTRACT

Methods for bidirectional communication and bidirectional communication buffers are described. In one embodiment, a method for bidirectional communication using first and second communication buses, which have opposite directions of data transmission, is described. The method for bidirectional communication involves detecting a signal from a first communication bus and buffering the detected signal and transmitting the buffered signal through a second communication bus while blocking data transmission from the second communication bus. Other embodiments are also described.

20 Claims, 11 Drawing Sheets

(56) References Cited

U.S. PATENT DOCUMENTS

| | | |
|---|---|---|
| 7,088,137 B2 | 8/2006 | Behrendt et al. |
| 9,846,671 B2 | 12/2017 | Sun |
| 2004/0225793 A1* | 11/2004 | Hunter ................ G06F 13/4045 710/300 |
| 2007/0182449 A1* | 8/2007 | Taylor ................. G06F 13/4072 326/80 |
| 2008/0218213 A1* | 9/2008 | Kobayashi ..... H03K 19/018521 326/81 |
| 2009/0153193 A1* | 6/2009 | Aranovsky .... H03K 19/018521 326/90 |
| 2009/0295429 A1* | 12/2009 | Hori ................... H03K 19/0175 326/80 |
| 2009/0327570 A1* | 12/2009 | Takehara ......... H03K 19/01759 710/316 |
| 2012/0002573 A1 | 1/2012 | Ceekala et al. |
| 2014/0184269 A1* | 7/2014 | Pubert ................ G06F 13/4072 326/56 |

* cited by examiner

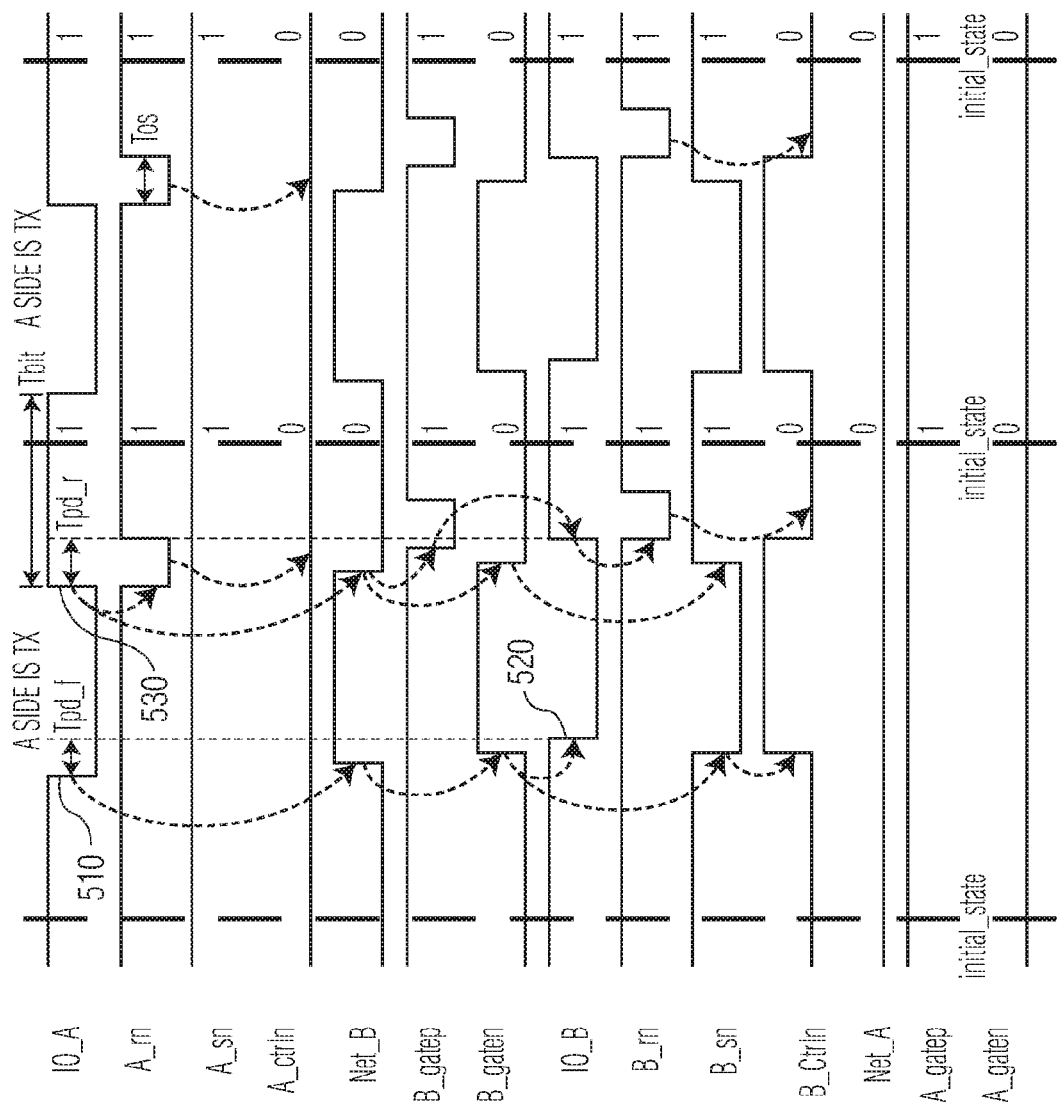

METHOD AND SYSTEM FOR BIDIRECTIONAL COMMUNICATION

CROSS-REFERENCE TO RELATED APPLICATIONS

This application claims the priority under 35 U.S.C. § 119 of Chinese patent application no. 201510242709.7, filed May 13, 2015 the contents of which are incorporated by reference herein.

A bidirectional communication buffer can act as an intermediate device between multiple communication devices that transmit data in different directions. For example, a bidirectional buffer circuit can be used to buffer data from two buses of opposite directions of data transmission. Bidirectional communication buffers can be used for various types of data communications. For example, a bidirectional buffer circuit can be used in a data storage device such as a memory/flash card or in a communications interface device such as a network card.

Current bidirectional communication buffers typically cannot support high-performance high speed transmission in a cost-effective manner. For example, some bidirectional buffer circuits require dedicated terminals/pins to detect the data transmission direction. However, a dedicated terminal/pin occupies circuitry space of a bidirectional buffer circuit and can reduce the reliability of transmission. Some bidirectional buffer circuits can detect the data transmission direction without dedicated terminals/pins. However, these bidirectional buffer circuits can only support low speed transmission and may generate spurs in transmitted signals, which affect data transmission performance.

Methods for bidirectional communication and bidirectional communication buffers are described. In one embodiment, a method for bidirectional communication using first and second communication buses, which have opposite directions of data transmission, is described. The method for bidirectional communication involves detecting a signal from a first communication bus and buffering the detected signal and transmitting the buffered signal through a second communication bus while blocking data transmission from the second communication bus. Other embodiments are also described.

In an embodiment, a bidirectional communication buffer includes a first control circuit operably connected to a first communication bus and configured to detect a first signal from the first communication bus, a second control circuit operably connected to the second communication bus and configured to block data transmission from the second communication bus, a first buffer circuit operably connected to the first communication bus, a second buffer circuit operably connected to the second communication bus and configured to buffer the first signal for transmission through the second communication bus and a switch circuit operably connected to the first and second control circuits and the first and second buffer circuits and configured to convey the first signal to the second buffer circuit. The first and second communication buses have opposite directions of data transmission.

In an embodiment, a method for bidirectional communication involves performing level shifting on an input signal received from a first communication bus to generate a processed signal, detecting a falling edge of the processed signal and buffering the processed signal and transmitting the buffered processed signal through a second communication bus while blocking data transmission from the second communication bus. The first and second communication buses have opposite directions of data transmission.

Other aspects and advantages of embodiments of the present invention will become apparent from the following detailed description, taken in conjunction with the accompanying drawings, depicted by way of example of the principles of the invention.

BRIEF DESCRIPTION OF THE DRAWINGS

FIG. 5 shows a signal timing diagram for the bidirectional communication buffer depicted in FIG. 2 under a low speed mode.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
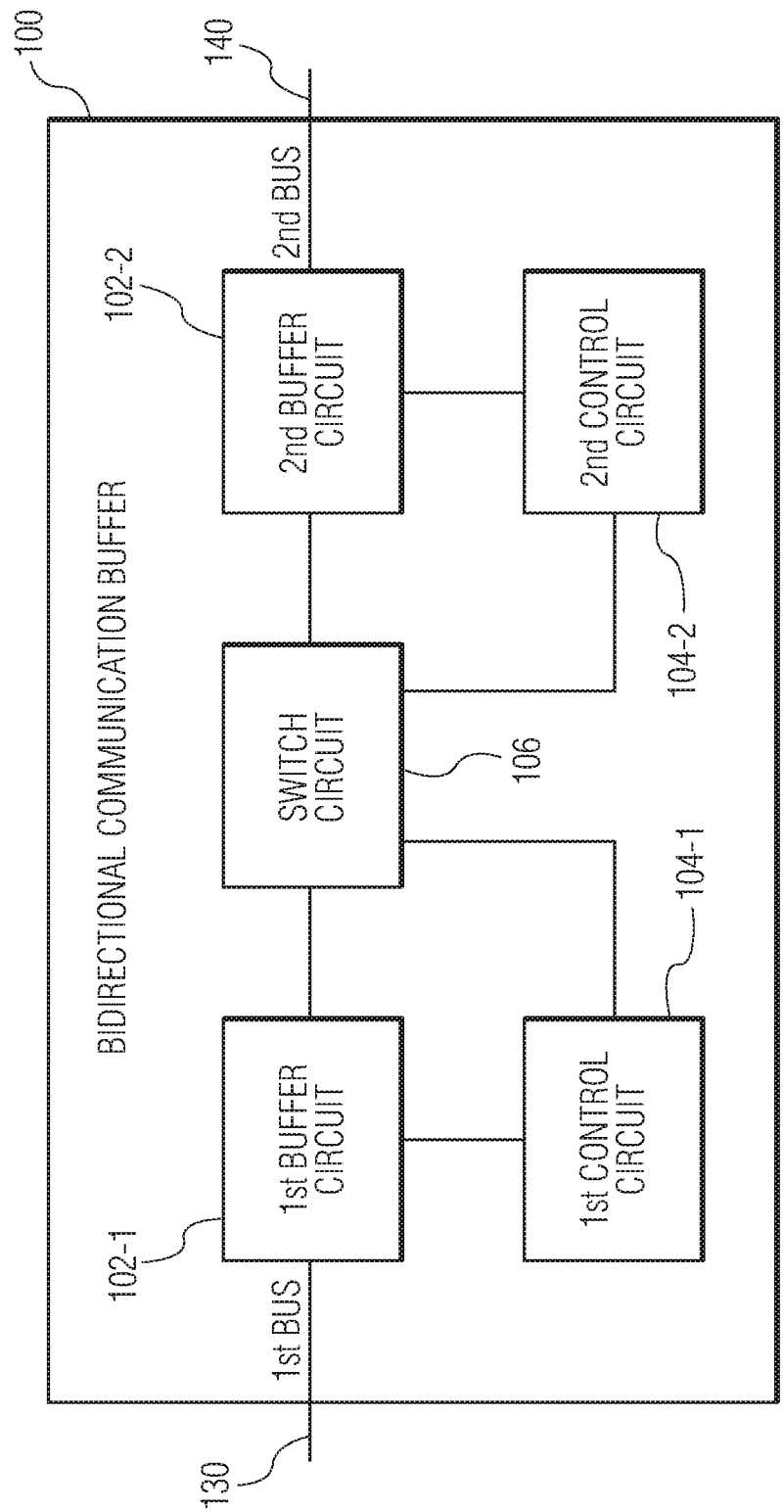
FIG. 1 is a schematic block diagram of a bidirectional communication buffer in accordance with an embodiment of the invention.

FIG. 1 is a schematic block diagram of a bidirectional communication buffer 100 in accordance with an embodiment of the invention. The bidirectional communication buffer acts as an intermediate device between multiple buses in different directions. For example, the bidirectional communication buffer can act as an intermediate device between a first bus 130 and a second bus 140 of opposite direction of the first bus. The bidirectional communication buffer buffers signals from the first bus and transmits the buffered signals through the second bus while blocking incoming signals from the second bus. Alternatively, the bidirectional communication buffer can buffer signals from the second bus and transmits the buffered signals through the first bus while blocking incoming signals from the second bus. The bidirectional communication buffer can be used for various types of data communications. For example, the bidirectional communication buffer can be used in a data storage device such as a memory/flash card or in a communications interface device such as a network card. In some embodiments, the bidirectional communication buffer is used for high speed bidirectional data transmissions, such that secure digital (SD) 3.0 compatible data transmissions.

In the embodiment depicted in FIG. 1, the bidirectional communication buffer 100 includes a first buffer circuit 102-1 operably connected to the first bus 130, a first control circuit 104-1, a switch circuit 106, a second buffer circuit 102-2 operably connected to the second bus, and a second control circuit 104-2. Although the bidirectional communication buffer is shown in FIG. 1 as being including certain components, in some embodiments, the bidirectional communication buffer includes more or less components to implement more or less functionalities. For example, the bidirectional communication buffer may include one or more additional buffer circuits to accommodate one or more additional buses. Compared to conventional bidirectional communication buffers that require terminals/pins for sensing/controlling the transmission direction, the bidirectional communication buffer does not need additional terminals/pins for sensing/controlling the transmission direction. Consequently, the circuit area of the bidirectional communication buffer can be saved and the reliability of transmission can be improved. In addition, compared to conventional bidirectional communication buffers that typically generate spurs in signals, the bidirectional communication buffer can buffer and transmit data without substantial amount of spurs. Consequently, the data transmission speed of the bidirectional communication buffer can be increased. For example, the bidirectional communication buffer can support SD 3.0 or other high speed data transmission protocols, which may a data transmission speed of 208 megabytes/second or higher.

The first buffer circuit 102-1 of the bidirectional communication buffer 100 is coupled to the first bus 130 and is configured to buffer signals to be transmitted through the first bus and/or signals received from the first bus. In some embodiments, the first buffer circuit includes a processing circuit that can modify (e.g., amplify) the signals received from the first bus and signals to be transmitted through the first bus. For example, the first buffer circuit may include a level shifter that performs level shifting on a signal received from the first bus by increasing the amplitude of the signal received from the first bus. In some embodiments, the level shifter increases the amplitude of a signal received from the first bus without affecting or changing the timing/phase of the signal received from the first bus.

The first control circuit 104-1 of the bidirectional communication buffer 100 is configured to control the switch circuit 106 to allow or disallow signals from the first bus 130 to pass through the switch circuit, based on signals from the first buffer circuit 102-1 and/or the second buffer circuit 102-2. In some embodiments, the first control circuit senses a falling edge and/or a rising edge of a signal from the first bus and generates control information to allow or disallow the signal from the first bus to pass through the switch circuit. The first control circuit does not require standalone terminals/pins for sensing/controlling the transmission direction. Consequently, the circuit area of the first control circuit can be saved and the reliability of transmission can be improved.

The second buffer circuit 102-2 of the bidirectional communication buffer 100 is coupled to the second bus 140 and is configured to buffer signals to be transmitted through the second bus and/or signals received from the second bus. In some embodiments, the second buffer circuit includes a processing circuit that can modify (e.g., amplify) the signals received from the second bus and signals to be transmitted through the second bus. For example, the second buffer circuit may include a level shifter that performs level shifting on a signal received from the second bus by increasing the amplitude of the signal received from the second bus. In some embodiments, the level shifter increases the amplitude of a signal received from the second bus without affecting or changing the timing/phase of the signal received from the second bus.

The second control circuit 104-2 of the bidirectional communication buffer 100 is configured to control the switch circuit 106 to allow or disallow signals from the second bus 140 to pass through the switch circuit, based on signals from the second buffer circuit 102-2 and/or the first buffer circuit 102-1. In some embodiments, the second control circuit senses a falling edge and/or a rising edge of a signal from the second bus and generates control information to allow or disallow the signal from the second bus to pass through the switch circuit. The second control circuit does not require standalone terminals/pins for sensing/controlling the transmission direction. Consequently, the circuit area of the second control circuit can be saved and the reliability of transmission can be improved.

The switch circuit 106 of the bidirectional communication buffer 100 is configured to allow or disallow signals from either the first bus 130 or the second bus 140 to pass through, based on inputs from the first control circuit 104-1 or the second control circuit 104-2. In some embodiments, the switch circuit conveys/transmits a signal from the first bus to the second buffer circuit 102-2 and conveys/transmits a signal from the second bus to the first buffer circuit 102-1.

Figure 2:
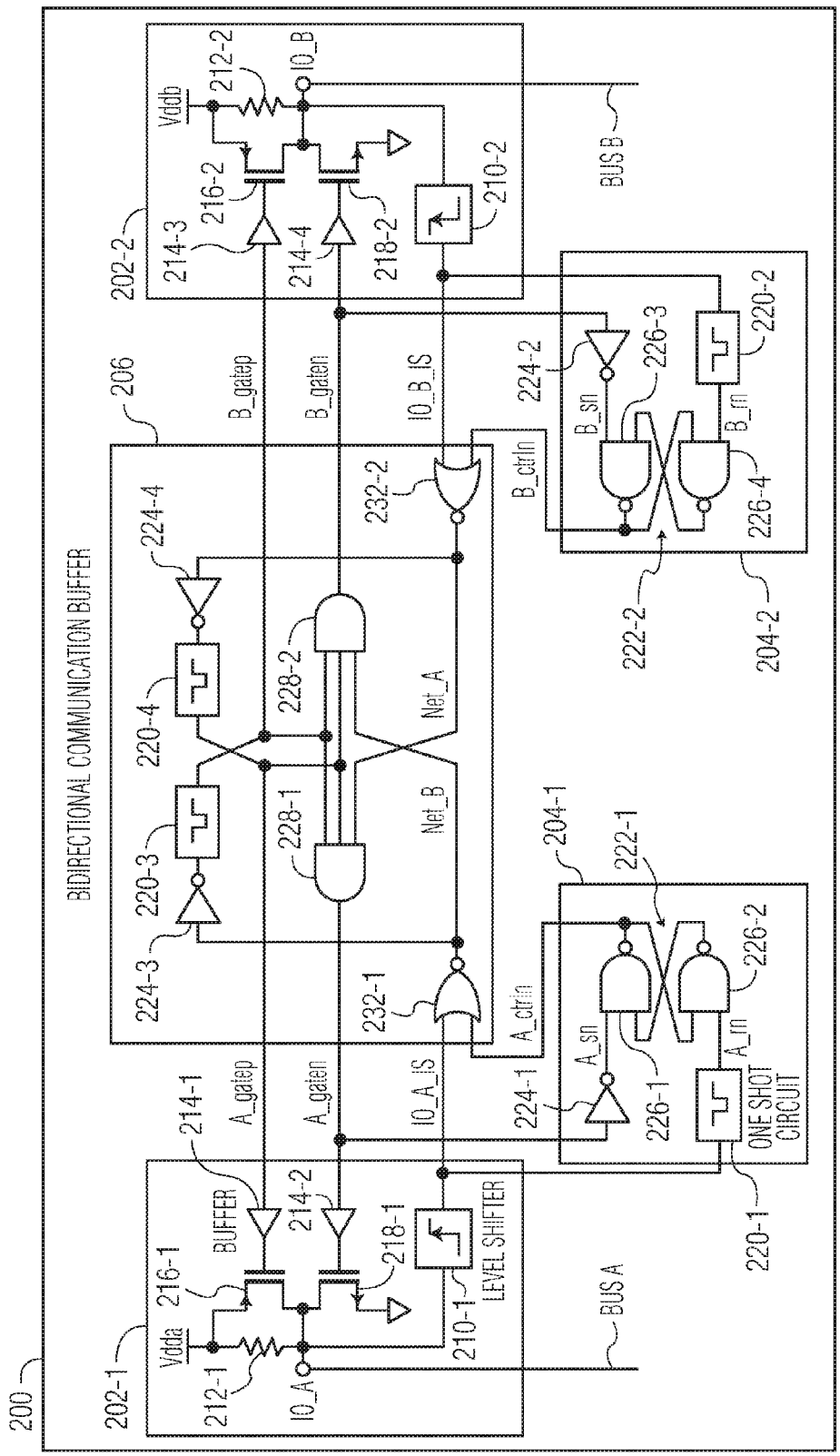
FIG. 2 depicts an embodiment of the bidirectional communication buffer depicted in FIG. 1.

FIG. 2 depicts an embodiment of the bidirectional communication buffer 100 depicted in FIG. 1. In the embodiment depicted in FIG. 2, a bidirectional communication buffer 200 includes a first buffer circuit 202-1 operably connected to bus A, a first control circuit 204-1, a switch circuit 206, a second buffer circuit 202-2 operably connected to bus B, and a second control circuit 204-2. The bidirectional communication buffer depicted in FIG. 2 is one of the possible implementations of the bidirectional communication buffer depicted in FIG. 1. However, the bidirectional communication buffer depicted in FIG. 1 can be implemented differently from the bidirectional communication buffer depicted in FIG. 2. The invention is not restricted to the particular implementation of the bidirectional communication buffer depicted in FIG. 2.

The first buffer circuit 202-1 of the bidirectional communication buffer 200 includes a level shifter 210-1, a pull-up resistor 212-1, two buffers 214-1, 214-2 and two transistors 216-1, 218-1. The first buffer circuit is configured to buffer signals, "A_gatep," "A_gaten," to be transmitted through bus A. The level shifter is configured to process a signal, "IO_A," from bus A to generate a signal, "IO_A_IS," by increasing the amplitude of the signal. In some embodiments, the signal, IO_A_IS, has the same timing/phase as the signal, IO_A. The pull-up resistor is connected to a voltage, "Vdda," and is configured to set the initial state when the bidirectional communication buffer is powered up. The buffers are configured to buffer signals, A_gatep, A_gaten, from bus B. The PMOS transistor 216-1 is connected to the buffer 214-1 while the NMOS transistor 218-1 is connected to the buffer 214-2. The PMOS transistor and the NMOS transistor are used to control the access of the buffers 214-1, 214-2 to bus A.

The first control circuit 204-1 of the bidirectional communication buffer 200 includes a one-shot circuit 220-1, a d-latch circuit 222-1 and an inverter or an NOT gate 224-1. The first control circuit is configured to control the switch circuit 206 to allow or disallow signals, IO_A, from the bus A to pass through the switch circuit. The one-shot circuit can be used to create a timing period of a fixed duration. In some embodiments, the one-shot circuit has a stable state and an unstable (transient) state. After the one-shot circuit enters the unstable state, the one-shot circuit returns to the stable state after a set time. In the embodiment depicted in FIG. 2, the one-shot circuit is configured to process a signal, IO_A_IS, from the level shifter 210-1 to generate a signal, "A_rn," to the d-latch circuit 222-1, by producing a delayed and inverted version of the signal, IO_A_IS, and combining the signal, IO_A_IS, with the delayed and inverted version of the signal, IO_A_IS. The d-latch circuit includes two cross-connected NANDs 226-1, 226-2. In the embodiment depicted in FIG. 2, the d-latch circuit receives the signal, A_rn, from the one-shot circuit and a signal, "A_sn," from the inverter 224-1 and generates an output signal, "A_ctrln."

The second buffer circuit 202-2 of the bidirectional communication buffer 200 includes a level shifter 210-2, a pull-up resistor 212-2, two buffers 214-3, 214-4 and two transistors 216-2, 218-2. The second buffer circuit is configured to buffer signals, "B_gatep," "B_gaten," to be transmitted through bus B. The level shifter is configured to process a signal, "IO_B," from bus B to generate a signal, "IO_B_IS," by increasing the amplitude of the signal. In some embodiments, the signal, IO_B_IS, has the same timing/phase as the signal, IO_B. The pull-up resistor is connected to a voltage, "Vddb," and is configured to set the initial state when the bidirectional communication buffer is powered up. The buffers are configured to buffer signals, B_gatep, B_gaten, from bus A. The PMOS transistor 216-2 is connected to the buffer 214-3 while the NMOS transistor 218-2 is connected to the buffer 214-4. The PMOS transistor and the NMOS transistor are used to control the access of the buffers 214-3, 214-3 to bus B.

The second control circuit 204-2 of the bidirectional communication buffer 200 includes a one-shot circuit 220-2, a d-latch circuit 222-2 and an inverter or an NOT gate 224-2. The second control circuit is configured to control the switch circuit 206 to allow or disallow signals, IO_B, from bus B to pass through the switch circuit. The one-shot circuit can be used to create a timing period of a fixed duration. In some embodiments, the one-shot circuit has a stable state and an unstable (transient) state. After the one-shot circuit enters the unstable state, the one-shot circuit returns to the stable state after a set time. In the embodiment depicted in FIG. 2, the one-shot circuit is configured to process a signal, IO_B_IS, from the level shifter 210-2 to generate a signal, "B_rn," to the d-latch circuit 222-2, by producing a delayed and inverted version of the signal, IO_B_IS, and combining the signal, IO_B_IS, with the delayed and inverted version of the signal, IO_B_IS. The d-latch circuit includes two cross-connected NANDs 226-3, 226-4. In the embodiment depicted in FIG. 2, the d-latch circuit 222-2 receives the signal, B_rn, from the one-shot circuit 220-2 and a signal, "B_sn," from the inverter 224-2 and generates an output signal, "B_ctrln."

The switch circuit 206 of the bidirectional communication buffer 200 includes two one-shot circuits 220-3, 220-4, two inverters 224-3, 224-4, two AND gates 228-1, 228-2, and two NOR gates 232-1, 232-2. The switch circuit is configured to allow or disallow signals IO_A_IS, IO_B_IS, from either bus A or bus B to pass through, based on input signal, A_ctrln, or B_ctrln, from the first control circuit 204-1 or the second control circuit 204-2.

An example of the operation of the first and second control circuits 204-1, 204-2 is described as follows. In an initial state, bus signals, IO_A and IO_B, are high as being pulled up by pull-up resistors 212-1, 212-2, the directional control signals, A_ctrln, and B_ctrln, are '0' and signals IO_A, IO_B, can be transmitted from either bus A or bus B. In the first control circuit 204-1, the one-shot circuit 220-1 and the d-latch circuit 222-1 sense the falling edge of the signal, IO_A_IS, from bus A and set the output signal, Net_B, of the NOR gate 232-1 to '0' to allow the signal, IO_A_IS, from bus A to pass the NOR gate 232-1. Once the signal, IO_A_IS, from bus A side starts to transmit, the bus B side d-latch output, B_ctrln, is set to logic high '1,' which block the bus B side NOR gate 232-2 such that signals only transmit from bus A side to bus B side. If bus A is released (i.e., the signal IO_A becomes '1'), the control circuits reset the signals, A_ctrln, and B_ctrln, to '0' for next transmission. In the second control circuit 204-2, the one-shot circuit 220-2 and the d-latch circuit 222-2 sense the falling edge of the signal, IO_B_IS, from bus B and set the output signal, Net_B, of the NOR gate 232-2 to '0' to allow the signal, IO_B_IS, from bus B to pass the NOR gate 232-2. Once the signal from bus B side starts to transmit, the bus A side d-latch output, A_ctrln, is set to logic high '1,' which block the bus A side NOR gate 232-1 such that the signal only transmit from bus B side to bus A side.

Figure 3:
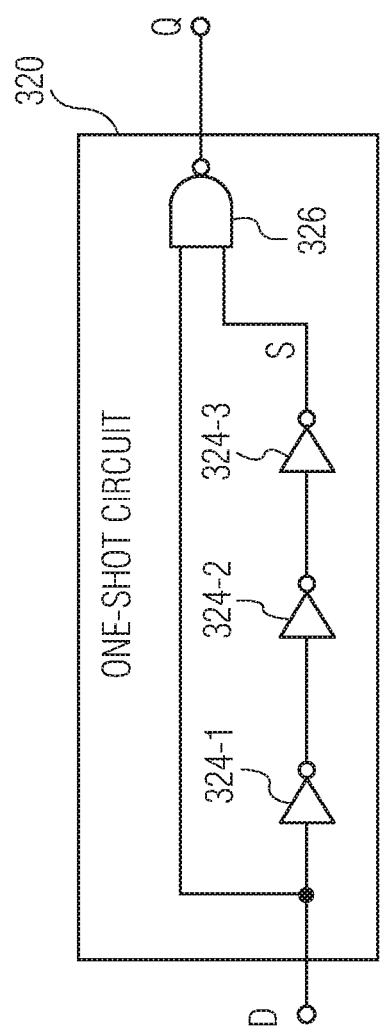
FIG. 3 depicts an embodiment of a one-shot circuit of the bidirectional communication buffer depicted in FIG. 2.

FIG. 3 depicts an embodiment of the one-shot circuit 220-1 or 220-2 depicted in FIG. 2. In the embodiment depicted in FIG. 3, a one-shot circuit 320 includes three inverters 324-1, 324-2, 324-3, and one NAND gate 326. The one-shot circuit depicted in FIG. 3 is one of the possible implementations of the one-shot circuit depicted in FIG. 2. However, the one-shot circuit depicted in FIG. 2 can be implemented differently from the one-shot circuit depicted in FIG. 3. For example, the one-shot circuit may include any other odd number of inverters, such as 5 inverters or 7 inverters. In addition, the inverters can be replaced by other delay cells/circuits. The invention is not restricted to the particular implementation of the one-shot circuit depicted in FIG. 3.

The one-short circuit 320 is used for detecting an edge (e.g., a rising edge or a falling edge) of signals from bus A or signals from bus B. The one-shot circuit can produce a delayed and inverted version, "S," of a signal, "D," from the level shifter 210-1 or 210-2 and combine the signal, D, with the delayed and inverted version, S, of the signal to generate an output signal, "Q." In the embodiment depicted in FIG. 3, the three inverters 324-1, 324-2, 324-3 receive the signal, D, from the level shifter and generate the delayed and inverted version, S, of the signal, D, with a delay time, Tos.

Figure 4A:
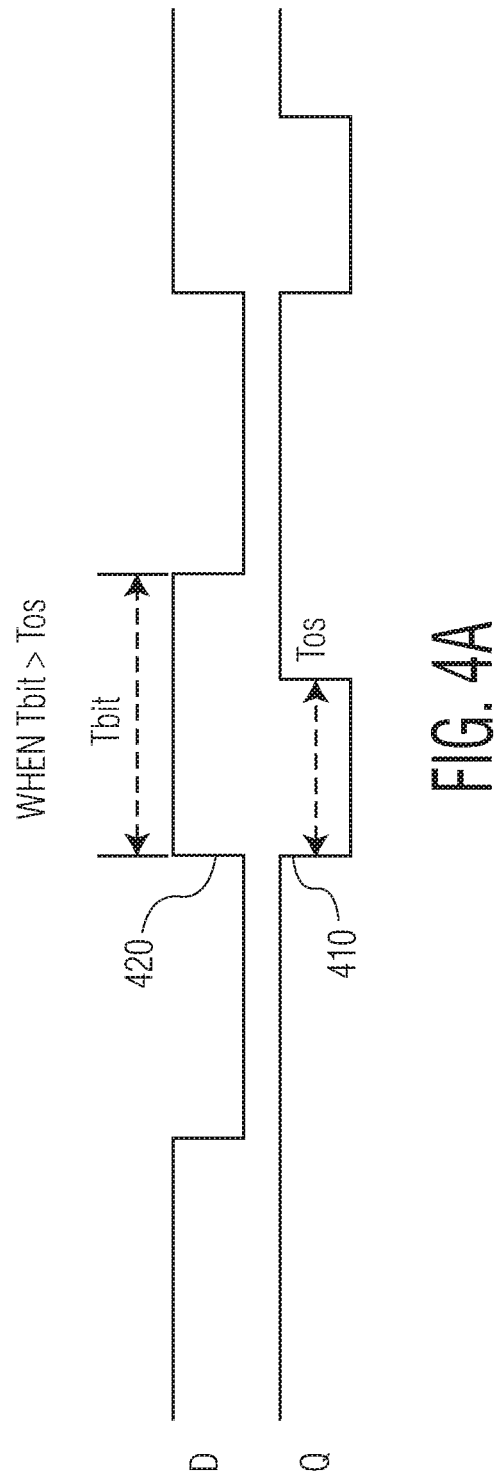
FIG. 4A shows a signal timing diagram for a low speed mode of the one-shot circuit depicted in FIG. 3.

At a low speed operational mode of the one-shot circuit 320, the time duration for one bit, Tbit, of the input signal, D, is greater than the delay time, Tos, of the output signal, Q, in relation to the input signal, D. FIG. 4A shows a signal timing diagram for a low speed mode of the one-shot circuit 320 depicted in FIG. 3. As shown in FIG. 4A, the rising edge of the signal, "D," is delayed the delay time, Tos. The one-shot circuit 320 generates the output signal, Q, with a falling edge 410 at a rising edge 420 of the signal, D, from bus A or bus B.

Figure 4B:
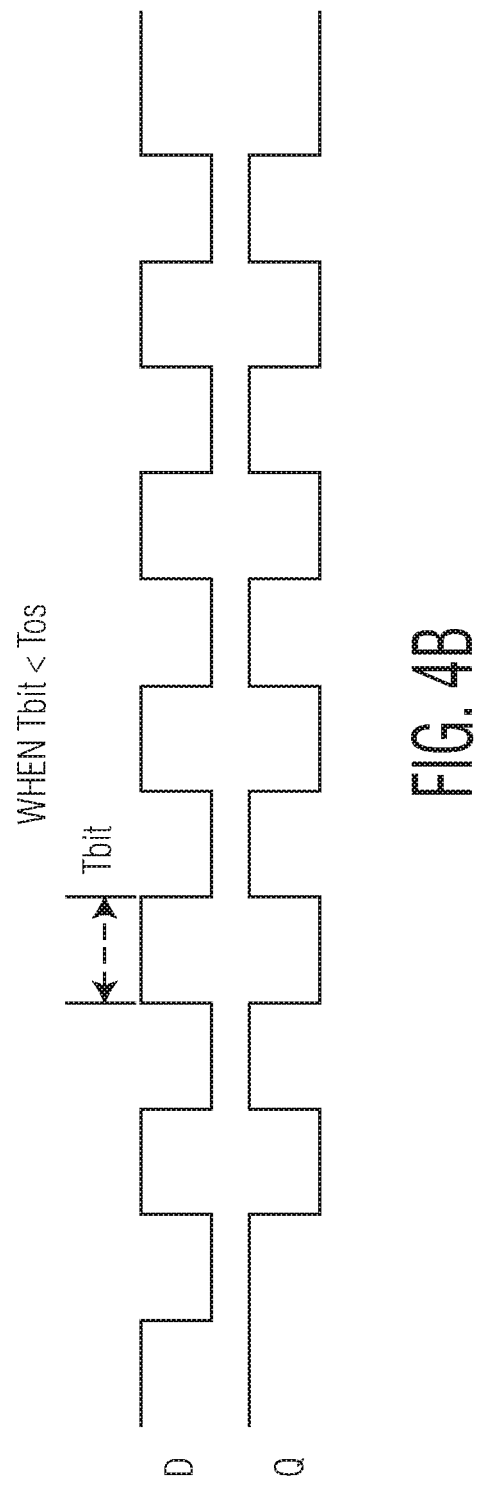
FIG. 4B shows a signal timing diagram for a high speed mode of the one-shot circuit depicted in FIG. 3.

At a high speed operational mode of the one-shot circuit 320, the time duration for one bit, Tbit, is less than or equal to the delay time, Tos. Consequently, at the high speed mode, the one-shot circuit can generate an inverted version of a signal from the level shifter. FIG. 4B shows a signal timing diagram for a high speed mode of the one-shot circuit depicted in FIG. 3. As shown in FIG. 4B, the output signal, Q, of the one-shot circuit is an inverted version of the input signal, D. The delay time, Tos, is equal to an odd integer time of the time duration for one bit, Tbit. For example, the delay time, Tos, may be 3 or 5 times of the time duration for one bit, Tbit.

FIG. 5 shows a signal timing diagram for the bidirectional communication buffer 200 depicted in FIG. 2 under a low speed mode. In the signal timing diagram depicted in FIG. 5, data transmission is always in the direction from bus A to bus B. As shown in FIG. 5, in an initial state, the directional control signals, A_ctrln, and B_ctrln, are '0' and the bus A signal, IO_A, and the bus A signal, IO_B, are HIGH or '1.' After the bus A signal, IO_A, changes from 1 to 0, the initial state is changed and data transmission starts on bus A. As a result of the falling edge 510 of the bus A signal, IO_A, the output signal, Net_B, of the NOR gate 232-1 changes from 0 to 1. In response to the change of the output signal, Net_B, of the NOR gate, the output signal, B_gaten, of the switch circuit 206, changes from 0 to 1, which causes the signal, B_sn, from the inverter 224-2 changes from 1 to 0 and the input signal, B_Ctrln, to the NOR gate 232-2 changes from 0 to 1, which blocks the transmission of bus B data through the NOR gate 232-2. After a time duration of Tpd_f, the bus B signal, IO_B, changes from 1 to 0, as indicated by the falling edge 520 of the bus B signal, IO_B. However, because the input signal, B_Ctrln, to the NOR gate 232-2 is set to 1, the transmission of bus B data through the NOR gate 232-2 is blocked. As a result of a rising edge 530 of the bus A signal, IO_A, the output signal, A_rn, of the one-shot circuit 220-1 changes from 1 to 0, and the output signal, Net_B, of the NOR gate 232-1 changes from 1 to 0. In response, the signal, B_gatep, and the signal, B_gaten, of the switch circuit, change from 1 to 0, which causes the output signal, B_sn, of the inverter 224-2 changes from 0 to 1. After a time duration of Tpd_r, the bus B signal, IO_B, changes from 0 to 1, which cause the signal, B_rn and the signal, B_ctrln to change from 1 to 0, and data is transmitted in the direction from bus A to bus B.

Figure 6:
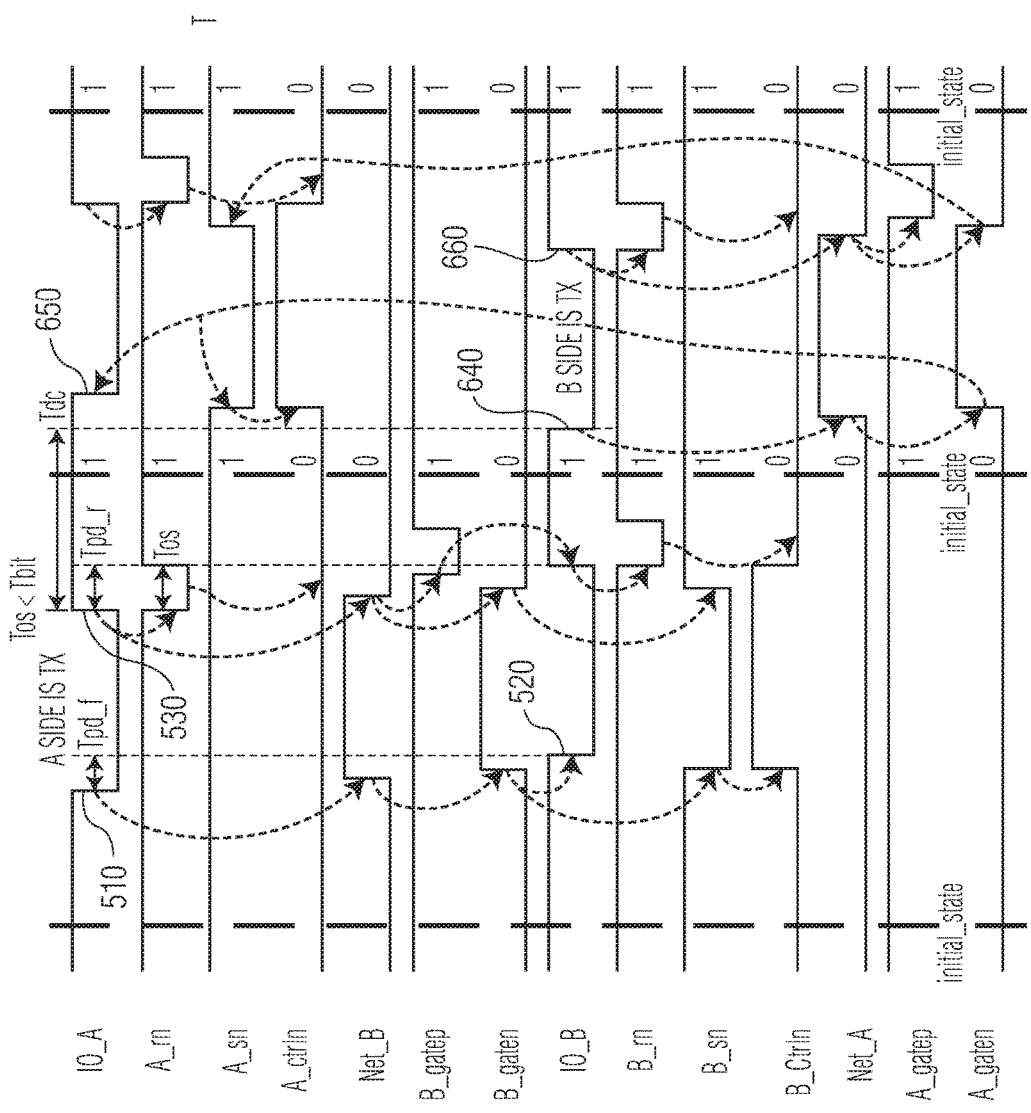
FIG. 6 shows another signal timing diagram for the bidirectional communication buffer depicted in FIG. 2 under a low speed mode.

FIG. 6 shows another signal timing diagram for the bidirectional communication buffer 200 depicted in FIG. 2 under a low speed mode. In the signal timing diagram depicted in FIG. 6, data transmission is first in the direction from bus A to bus B, and subsequently in the direction from bus B to bus A. The signal timing diagram depicted in FIG. 6 differs from the signal timing diagram depicted in FIG. 5 in that the bus B signal, IO_B, changes from 1 to 0, as indicated by the falling edge 640, before the bus A signal, IO_A, changes from 1 to 0, as indicated by the falling edge 650. Consequently, data transmission starts on bus B after the bus B signal, IO_B, changes from 1 to 0. As a result of the falling edge 640 of the bus B signal, IO_B, the output signal, Net_A, of the NOR gate 232-2 changes from 0 to 1. In response to the change of the output signal, Net_A, of the NOR gate 232-2, the output signal, A_gaten, of the switch circuit 206, changes from 0 to 1, which causes the signal, A_sn, from the inverter 224-1 changes from 1 to 0 and the input signal, A_Ctrln, to the NOR gate 232-1 changes from 0 to 1, which blocks the transmission of bus A data through the NOR gate 232-1. After a time duration of Tdc, the bus A signal, IO_A, changes from 1 to 0. However, because the input signal, A_Ctrln, to the NOR gate 232-1 is set to 1, the transmission of bus A data through the NOR gate 232-1 is blocked. As a result of a rising edge 660 of the bus B signal, IO_B, the output signal, B_rn, of the one-shot circuit 220-2 changes from 1 to 0, and the output signal, Net_A, of the NOR gate 232-2 changes from 1 to 0. In response, the signal, A_gatep, and the signal, A_gaten, of the switch circuit, change from 1 to 0, which causes the signal, A_sn, changes from 0 to 1, and the bidirectional communication buffer returns to the initial state.

Figure 7:
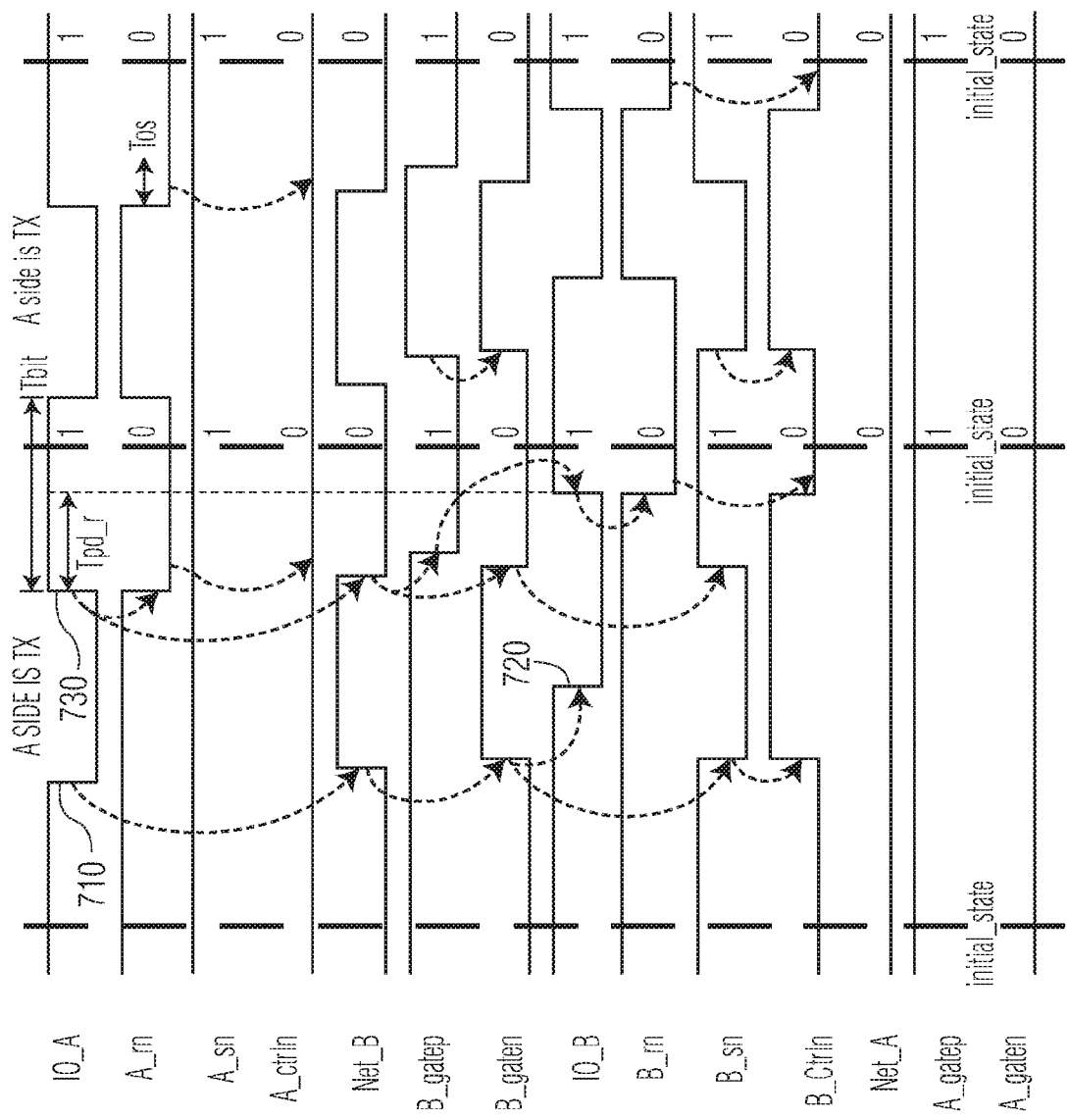
FIG. 7 shows a signal timing diagram for the bidirectional communication buffer depicted in FIG. 2 under a high speed mode.

FIG. 7 shows a signal timing diagram for the bidirectional communication buffer 200 depicted in FIG. 2 under a high speed mode. In the signal timing diagram depicted in FIG. 7, data transmission is always in the direction from bus A to bus B. As shown in FIG. 7, in an initial state, the directional control signals, A_ctrln, and B_ctrln, are '0' and the bus A signal, IO_A, and the bus A signal, IO_B, are HIGH. After the bus A signal, IO_A, changes from 1 to 0, the initial state is changed and data transmission starts on bus A. As a result of the falling edge 710 of the bus A signal, IO_A, the output signal, Net_B, of the NOR gate 232-1 changes from 0 to 1. In response to the change of the output signal, Net_B, of the NOR gate 232-1, the output signal, B_gaten, of the switch circuit 206, changes from 0 to 1, which causes the signal, B_sn, from the inverter 224-2 changes from 1 to 0 and the input signal, B_Ctrln, to the NOR gate 232-2 changes from 0 to 1, which blocks the transmission of bus B data through the NOR gate 232-2. Subsequently, the bus B signal, IO_B, changes from 1 to 0, as indicated by the falling edge 720 of the bus B signal, IO_B. However, because the input signal, B_Ctrln, to the NOR gate 232-2 is set to 1, the transmission of bus B data through the NOR gate 232-2 is blocked. As a result of a rising edge 730 of the bus A signal, IO_A, the output signal, A_rn, of the one-shot circuit 220-1 changes from 1 to 0, and the output signal, Net_B, of the NOR gate 232-1 changes from 1 to 0. In response, the signal, B_gatep, and the signal, B_gaten, of the switch circuit, change from 1 to 0, which causes the signal, B_sn, changes from 0 to 1, and data is transmitted in the direction from bus A to bus B.

Figure 8:
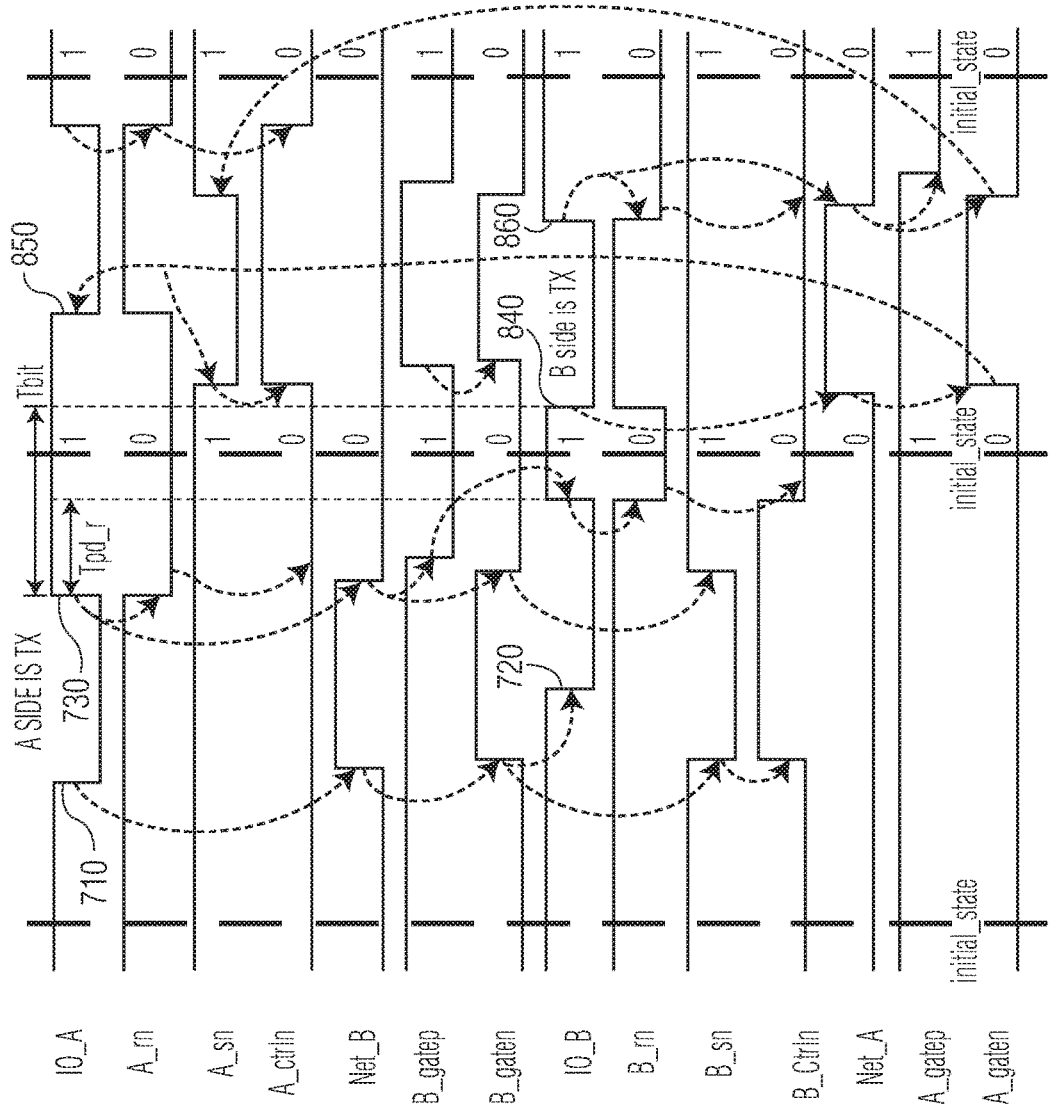
FIG. 8 shows another signal timing diagram for the bidirectional communication buffer depicted in FIG. 2 under a high speed mode.

FIG. 8 shows another signal timing diagram for the bidirectional communication buffer 200 depicted in FIG. 2 under a high speed mode. In the signal timing diagram depicted in FIG. 8, data transmission is first in the direction from bus A to bus B, and then in the direction from bus B to bus A. The signal timing diagram depicted in FIG. 8 differs from the signal timing diagram depicted in FIG. 7 in that the bus B signal, IO_B, changes from 1 to 0, as indicated by the falling edge 840, before the bus A signal, IO_A, changes from 1 to 0, as indicated by the falling edge 850. Consequently, after the bus B signal, IO_B, changes from 1 to 0, data transmission starts on bus B. As a result of the falling edge 840 of the bus B signal, IO_B, the output signal, Net_A, of the NOR gate 232-2 changes from 0 to 1. In response to the change of the output signal, Net_A, of the NOR gate 232-2, the output signal, A_gaten, of the switch circuit 206, changes from 0 to 1, which causes the signal, A_sn, from the inverter 224-1 changes from 1 to 0 and the input signal, A_Ctrln, to the NOR gate 232-1 changes from 0 to 1, which blocks the transmission of bus A data through the NOR gate 232-1. Subsequently, the bus A signal, IO_A, changes from 1 to 0. However, because the input signal, A_Ctrln, to the NOR gate 232-1 is set to 1, the transmission of bus A data through the NOR gate 232-1 is blocked. As a result of a rising edge 860 of the bus B signal, IO_B, the output signal, B_rn, of the one-shot circuit 220-2 changes from 1 to 0, and the output signal, Net_A, of the NOR gate 232-2 changes from 1 to 0. In response, the signal, A_gatep, and the signal, A_gaten, of the switch circuit, change from 1 to 0, which causes the signal, A_sn, changes from 0 to 1, and the bidirectional communication buffer returns to the initial state.

Figure 9:
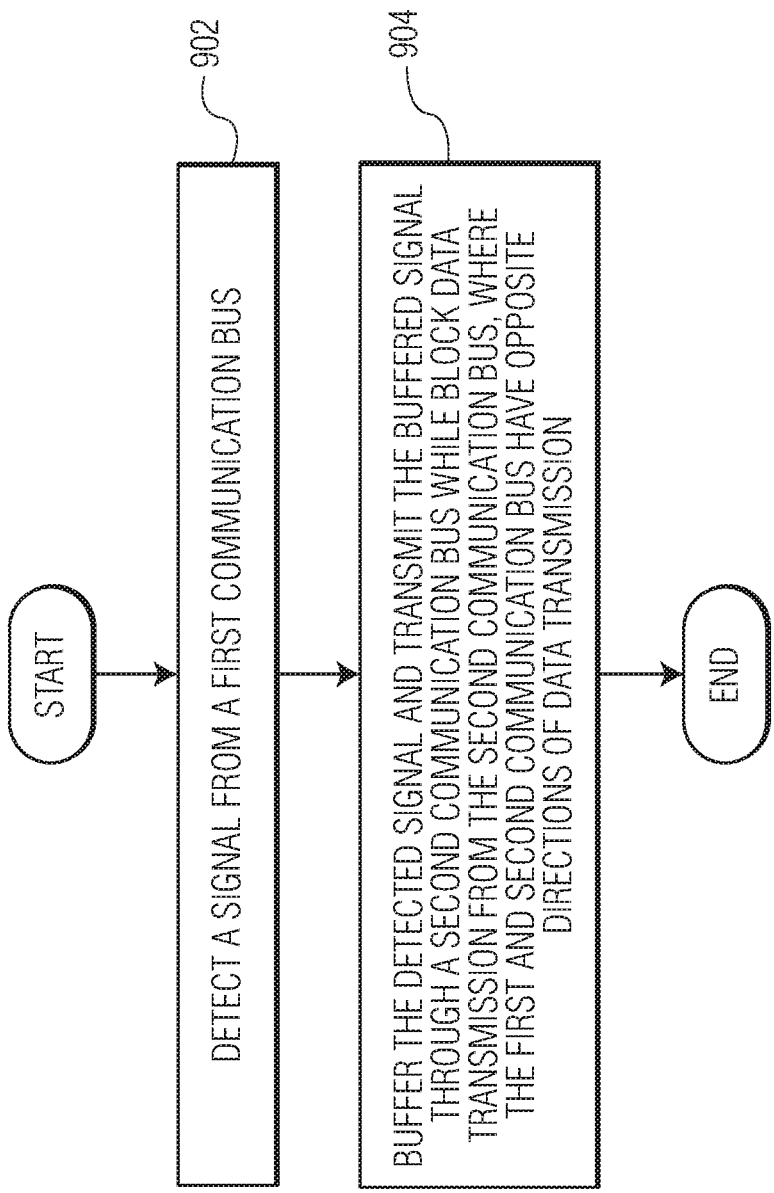
FIG. 9 is a process flow diagram of a method for bidirectional communication in accordance with an embodiment of the invention.

FIG. 9 is a process flow diagram of a method for bidirectional communication in accordance with an embodiment of the invention. At block 902, a signal from a first communication bus is detected. At block 904, the detected signal is buffered and the buffered signal is transmitted through a second communication bus while data transmission from the second communication bus is blocked. The first and second communication buses have opposite directions of data transmission.

Figure 10:
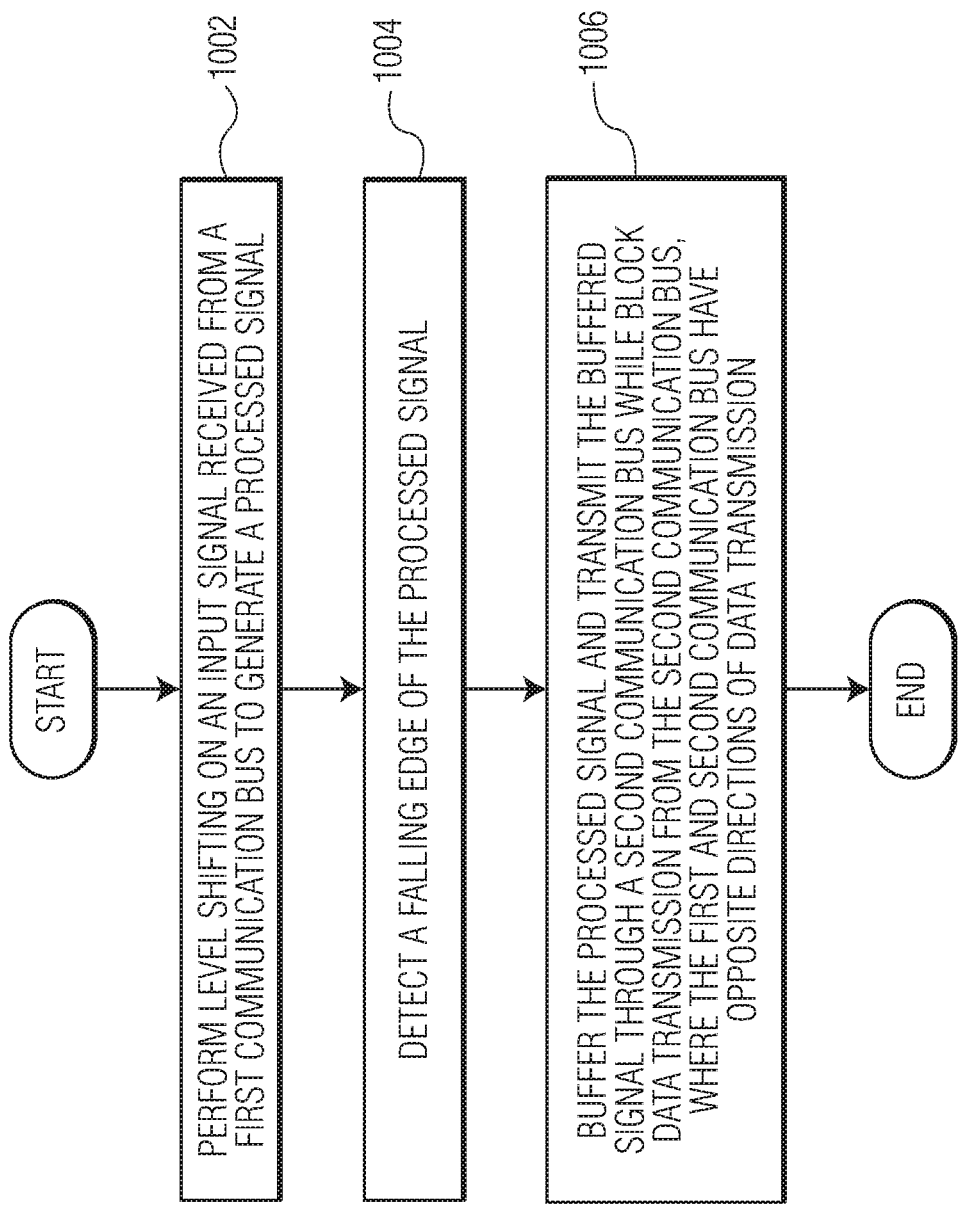
FIG. 10 is a process flow diagram of a method for bidirectional communication in accordance with an embodiment of the invention.

FIG. 10 is a process flow diagram of a method for bidirectional communication in accordance with an embodiment of the invention. At block 1002, level shifting is performed on an input signal received from a first communication bus to generate a processed signal. At block 1004, a falling edge of the processed signal is detected. At block 1006, the processed signal is buffered and the buffered processed signal is transmitted through a second communication bus while data transmission from the second communication bus is blocked. The first and second communication buses have opposite directions of data transmission.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for bidirectional communication, the method comprising:
   detecting, with a control circuit, a signal from a first communication bus, wherein the control circuit comprises a one-shot circuit and a latch circuit; and
   buffering the detected signal and transmitting the buffered signal through a second communication bus while blocking data transmission from the second communication bus, wherein the first and second communication buses have opposite directions of data transmission, and detecting the signal from the first communication bus comprises
   detecting a falling edge and/or a rising edge of the signal from the first communication bus.

2. The method of claim 1, further comprising:
   performing level shifting on an input signal received from the first communication bus to generate the signal.

3. The method of claim 1, wherein buffering the detected signal and transmitting the buffered signal through the second communication bus further comprises:
   generating a control signal to control a logic circuit through which the signal is transmitted onto the second communication bus.

4. The method of claim 3, wherein the logic circuit comprises an NOR gate through which the signal is transmitted onto the second communication bus.

5. The method of claim 3, wherein generating the control signal to control the logic circuit through which the signal is transmitted onto the second communication bus further comprises:
   generating a delayed and inverted version of the signal; and
   combining the signal with the delayed and inverted version of the signal.

6. The method of claim 5, wherein generating the delayed and inverted version of the signal further comprises:
   processing the signal using an odd number of at least three inverters, and wherein combining the signal with the delayed and inverted version of the signal further comprises:
   inputting the signal and the delayed and inverted version of the signal into a NAND gate.

7. The method of claim 3, wherein blocking data transmission from the second communication bus further comprises:
   in response to the control signal, generating a second control signal to control a second logic circuit through which a signal from the second communication bus is transmitted.

8. The method of claim 7, wherein the second logic circuit comprises an NOR gate through which the signal from the second communication bus is transmitted.

9. The method of claim 1, wherein detecting the signal from the first communication bus further comprises:
   detecting the falling edge of the signal from the first communication bus before detecting a falling edge of a second signal from the second communication bus.

10. A bidirectional communication buffer, the bidirectional communication buffer comprising:
- a first control circuit operably connected to a first communication bus and configured to detect a first signal from the first communication bus;
- a second control circuit operably connected to the second communication bus and configured to block data transmission from the second communication bus, wherein the first and second communication buses have opposite directions of data transmission;
- a first buffer circuit operably connected to the first communication bus;
- a second buffer circuit operably connected to the second communication bus and configured to buffer the first signal for transmission through the second communication bus; and
- a switch circuit operably connected to the first and second control circuits and the first and second buffer circuits and configured to convey the first signal to the second buffer circuit, wherein the first control circuit comprises a one-shot circuit and a first latch circuit configured to detect a falling edge and/or rising edge of the first signal.

11. The bidirectional communication buffer of claim 10, wherein the first buffer circuit further comprises:
- a level shifter configured to perform level shifting on an input signal received from the first communication bus to generate the first signal.

12. The bidirectional communication buffer of claim 10, wherein the one-shot circuit further comprises:
- an odd number of at least three inverters configured to generate a delayed and inverted version of the first signal; and
- a NAND gate configured to receive the first signal and the delayed and inverted version of the first signal.

13. The bidirectional communication buffer of claim 10, wherein the switch circuit further comprises:
- a first NOR gate through which the first signal is transmitted onto the second communication bus, and wherein the first latch circuit is configured to generate a control signal to control the first NOR gate.

14. The bidirectional communication buffer of claim 13, wherein the second control circuit further comprises:
- a one-shot circuit and a second latch circuit configured to detect a falling edge or a rising edge of a second signal from the second communication bus, wherein the switch circuit further comprises:
- a second NOR gate through which the second signal is transmitted onto the first communication bus, and wherein the second latch circuit of the second control circuit is configured to generate a control signal to control the first NOR gate.

15. A storage device comprising the bidirectional communication buffer of claim 10.

16. A method for bidirectional communication, the method comprising:
- performing level shifting on an input signal received from a first communication bus to generate a processed signal;
- detecting, with a control circuit, a falling edge of the processed signal, wherein the control circuit comprises a one-shot circuit and a latch circuit; and
- buffering the processed signal and transmitting the buffered processed signal through a second communication bus while blocking data transmission from the second communication bus, wherein the first and second communication buses have opposite directions of data transmission.

17. The method of claim 15, wherein buffering the processed signal and transmitting the buffered processed signal through the second communication bus further comprises:
- generating a control signal to control a first NOR gate through which the processed signal is transmitted onto the second communication bus.

18. The method of claim 16, wherein generating the control signal to control the first NOR gate through which the processed signal is transmitted onto the second communication bus further comprises:
- generating a delayed and inverted version of the processed signal using an odd number of at least three inverters; and
- inputting the processed signal and the delayed and inverted version of the signal into a NAND gate, wherein blocking data transmission from the second communication bus further comprises;
- in response to the control signal, generating a second control signal to control a second NOR gate through which a signal from the second communication bus is transmitted.

19. The method of claim 1, wherein the latch circuit is a D-latch circuit.

20. The method of claim 10, wherein the latch circuit is a D-latch circuit.

* * * * *